United States Patent [19]

Westerfield et al.

[11] Patent Number: 5,157,695
[45] Date of Patent: Oct. 20, 1992

[54] VARIABLE PULSE RATE CIRCUIT

[75] Inventors: Edwin E. Westerfield, Silver Spring; Larry L. Warnke, Laurel; William S. Devereux, Glenelg, all of Md.

[73] Assignee: U.S. Government of America, as represented by the Secretary of the Navy, Washington, D.C.

[21] Appl. No.: 149,298

[22] Filed: Jan. 28, 1988

[51] Int. Cl.[5] .......................................... H04L 7/04
[52] U.S. Cl. ..................................... 375/96; 375/116; 375/118; 328/63
[58] Field of Search .................... 375/96, 1, 118, 119, 375/116, 120, 115; 370/104, 108, 107; 455/12; 328/63, 74, 75, 155; 307/271, 269; 331/1 A; 377/78, 81; 342/108, 357, 378; 380/48, 49

[56] References Cited

U.S. PATENT DOCUMENTS

| | | | |
|---|---|---|---|
| 3,596,002 | 7/1971 | Ohnsorge et al. | 375/96 |
| 4,414,676 | 11/1983 | Kraul et al. | 375/119 |
| 4,528,674 | 7/1985 | Sweeney et al. | 375/96 |
| 4,530,103 | 7/1985 | Mosley, Jr. et al. | 375/1 |

Primary Examiner—David Cain
Attorney, Agent, or Firm—John P. Targano

[57] ABSTRACT

A variable pulse rate circuit for correlating a locally generated code with a code that is being transmitted by a space vehicle. A computer means is used for providing a binary word to a latch. The binary word in the latch is used in turn by a delay line, to control the amount of delay that is presented to pulses. The pulses are emitted by a pulse generator having a fixed rate reference. The pulse rate, of pulses being emitted by of the delay line, is varied from the reference pulse rate. This variation is the result of computer means that rapidly changes the amount of delay of the delay line. The pulse rate and the pulse phase are varied in order to cause a locally generated code to become phase aligned with the code received from the space vehicle. The space vehicle is tracked using the variable pulse rate circuit.

3 Claims, 3 Drawing Sheets

VARIABLE PULSE RATE CIRCUIT

BACKGROUND OF THE INVENTION

1. Background

The present invention relates to a method for generating a variable pulse rate that is precisely controllable by a computer.

2. Description of Prior Art

A relevant publication was made by the Institute of Electrical and Electronic Engineers (IEEE). The publication is entitled "A GPS Fast Acquisition Receiver". The publication occurred in 1983. The publication was the result of an IEEE National Telesystems Conference held in November 1983. The publication has IEEE identification number CH 1975-2/83/0000-0214.

The publication shows some elements of the variable pulse rate circuit. However, the publication does not teach that a latch must be used. The latch is placed between a computer and a delay line, in order to produce a complete variable pulse rate circuit. The latch is needed to hold a computer word coming from the computer, for continuing use of the computer word by the delay line.

In the past, a variable frequency oscillator was used in satellite tracking receiver circuits. The frequency and phase of the oscillator was varied in order to properly control a code generator. The code generator generated code sequences which were correlated with code sequences transmitted by the satellites. The circuitry for that device is considerable more complex that the circuit described here.

BRIEF DESCRIPTION OF THE INVENTION

The present invention generates a variable pulse rate by use of a fixed frequency source of pulses and a delay line whose delay can be varied over a limited range under computer control. By using this technique greater frequency and phase control during a satellite tracking process can be achieved and the required hardware and software is simpler.

In the variable pulse rate circuit of the present invention, the desired pulses are emitted by the delay line. The input to the delay line is obtained from a source of fixed frequency pulses. The pulses are delayed within the delay line for a determined period of time, under the control of a latch. The latch is under the control of a computer. If the computer does not command a change of delay value the delay line output rate will equal the rate of the pulse generator supplying the input pulses to the delay line but with an offset phase. If the computer commands small time delay changes at a fixed rate the output rate will be different than the input rate, i.e. the relative phase between the input and output will be continuously changing. When the delay is being increased the output pulse rate will be less than that of the pulse generator supplying the delay line input. When the delay is being decreased the pulse rate will be greater than that of the pulse generator. When the rate is being lowered below that of the pulse generator the delay of the delay line is increased until it is equal to the period of the signal from the pulse generator. At that point the delay is set back to zero. The timing of the signal that causes the data latch to accept the new data, i.e. zero setting, is so timed, via a fixed delay line, that when the transition occurs no loss of output pulses will occur. The computer will then continue to increase the delay. The reverse will occur when the delay is being decreased. When the delay value becomes equal to zero, the computer will then set it to the delay value of one pulse period (977 ns). Again the timing is such that no pulses will be lost. The pulses provided by the delay output are used as clock pulses by a code generator.

An object of the invention is to produce a variable pulse rate circuit that operates from a fixed frequency pulse generator and can be precisely controlled by a computer.

DESCRIPTION OF THE PREFERRED EMBODIMENT

A description of a preferred embodiment of the invention is given below.

Figure 1:
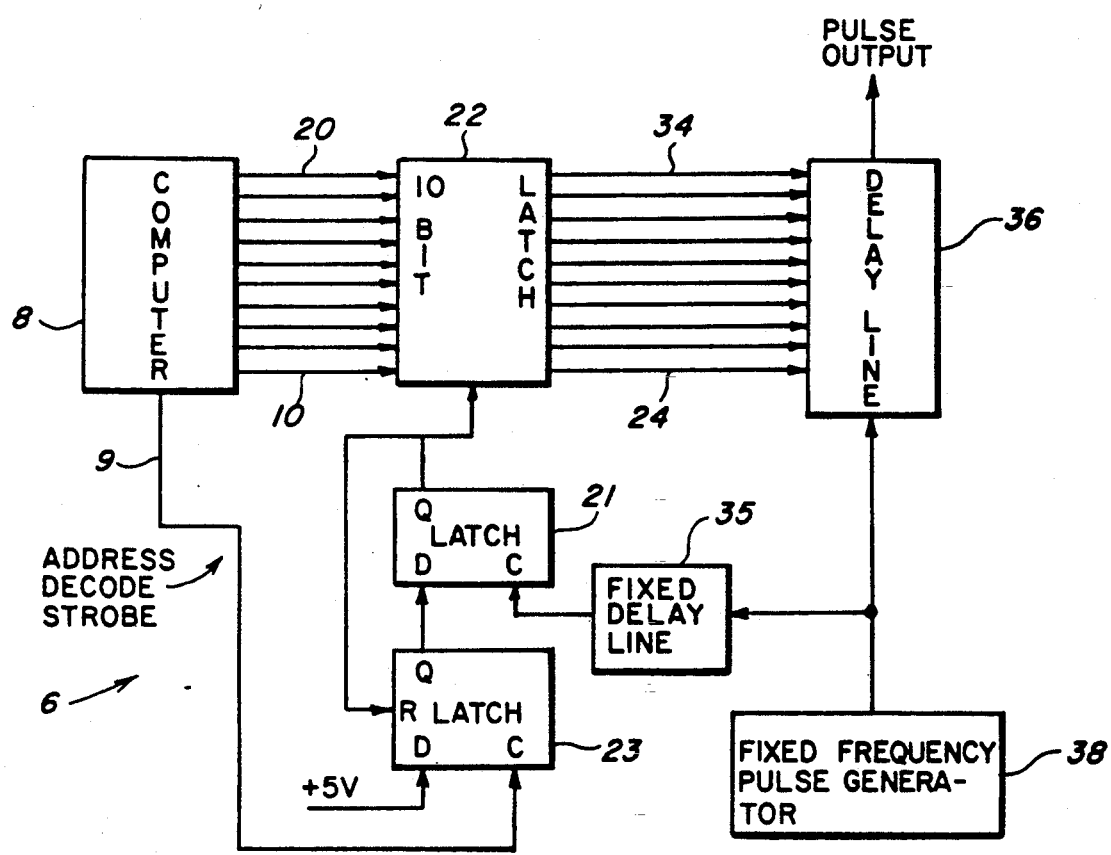
FIG. 1 is a block diagram of a variable pulse rate circuit.

In FIG. 1, a pulse delay circuit 6 has a computer 8. The computer 8 is programmed to send out successive 10-bit words. Each 10-bit word produces a different delay in pulse delay circuit 6. In the variable pulse rate circuit, the amount of delay is changeable in 1 nanosecond steps by the use of 977 different 10 bit words. The 10-bit words are sent out to the computer 8 over lines 10 to 20 inclusive. Line 10 carries the first bit of the 10 bit-word.

The 10-bit words are sent into a 10-bit latch 22. This latch 22 has ten flip-flops therein. A 10-bit word is stored in the 10-bit latch 22. A new word is sent to the latch 22 from computer 8 when required. Timing of the transfer of the word is controlled by signal latches 21 and 23. Latch 23 is set by a data transfer signal from the computer while latch 21 is set by a signal from the fixed rate pulse generator 38, delayed by fixed delay line 35.

Each flip-flop of the 10-bit latch is set to the level 0 or 1, depending on whether a "zero" or "one" bit comes into it over its corresponding input line. The 10 bits of the 10-bit word are stored in the 10 flip-flops.

Figure 2:
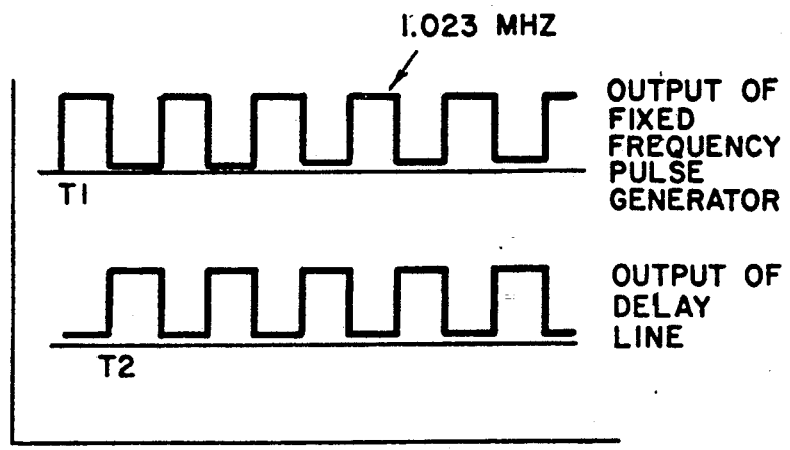
FIG. 2 is a timing diagram of both pulses generated by a fixed rate pulse generator and those pulses as delayed by a delay line.

The states of the flip-flops are sent over lines 24 to 34, into the digital delay line 36. The delay line 36 can assume 1024 different delay times, but only 977 delay times are used. In the variable pulse rate circuit 6, the delay times used are 1 nanosecond to 977 nanoseconds. These delay times correspond to 977 different 10-bit words that may be inputed into it from latch 22. The delay times are in 1 nanosecond steps. As shown in FIG. 2, for a 10 bit word 0111101001, the delay time produced by delay line 36 would be 489 nanoseconds. A 1.023 megahertz pulse train is shown.

A square wave pulse generator 38 sends out a train of square wave pulses into delay line 36. The pulse generator 38 has a fixed frequency. The frequency of the output pulses of the pulse generator 38 is 1.023 megahertz and is synthesized from a frequency generated by an external reference oscillator. The period of time between successive square wave pulses is 977.5 nanoseconds.

With delay line 36, set by 10=bit word 0111110011, a delay of 489 nanoseconds shifts the phase of a pulse train coming out of delay line 36 by 489 nanoseconds. FIG. 2 shows such a shift in phase of the square wave pulses coming out of delay line 36.

The time delay is T2−T1. The start of pulses coming out of delay line 36 may be delayed by a desired amount of time, in 1 nanosecond increments, from 1 nanosecond up to 977 nanoseconds, in the preferred embodiment.

Figure 3:
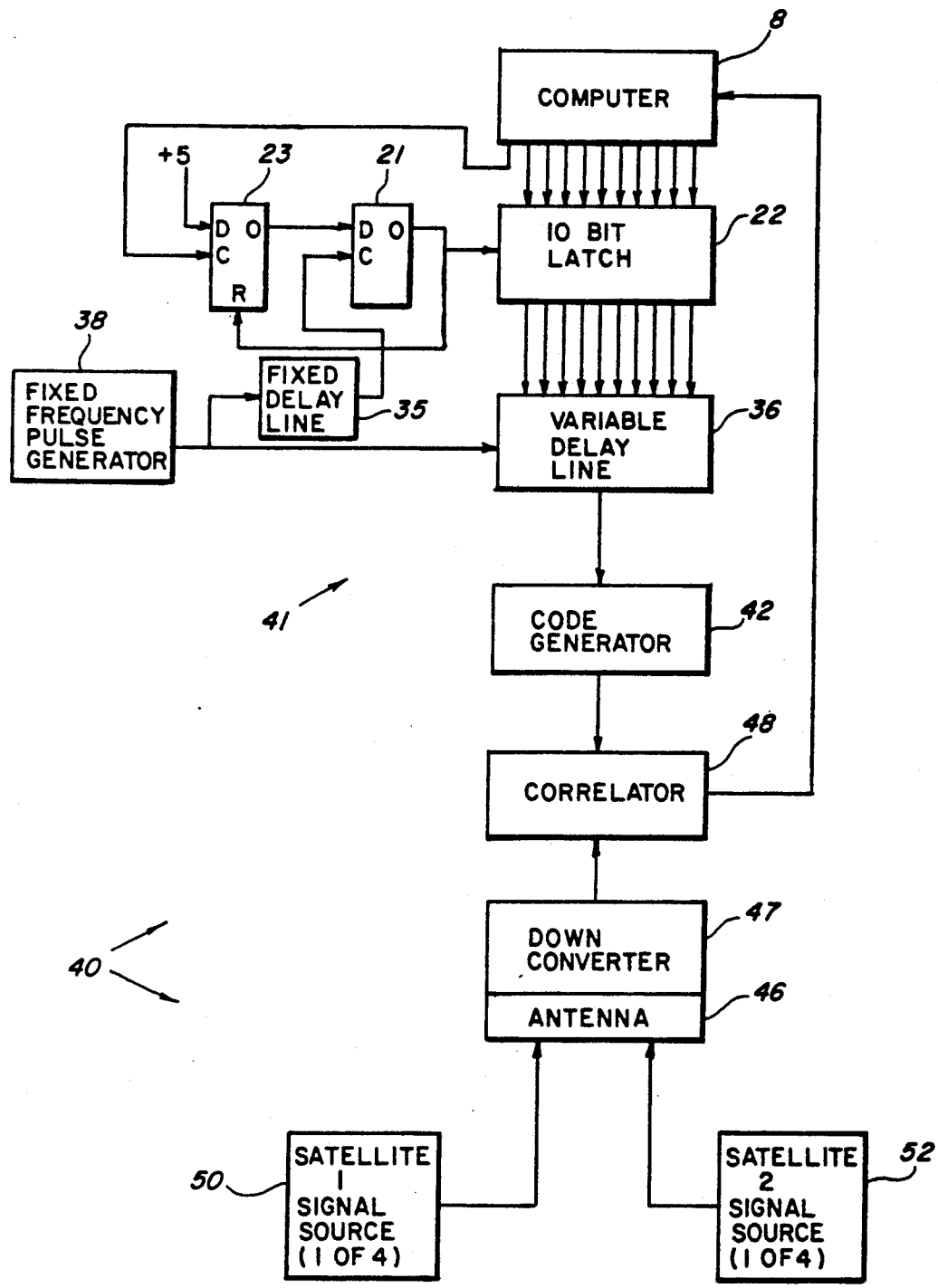
FIG. 3 is a block diagram of a satellite tracking system.

FIG. 3 shows a simplified satellite tracking system 40 used for determining the position and velocity of the user by tracking signals radiated by Global Positioning System or equivalent satellites. The satellite tracking system comprises a receiver circuit 41 and associated satellites. Each satellite transmits an RF carrier that is phase modulated by a pseudo random sequence that is 1023 bits long. The code frequency is clocked at a rate of 1.023 Mhz per second and is repeated every millisecond. Each satellite transmits a different code sequence. The phase of the code received at the receiver from a given satellite varies in phase as the distance of the satellite from the receiver varies.

The train of delay pulses from delay line 36 are used as clock pulses by a code generator 42. The code generator 42 produces a sequence of bits that is 1023 bits long and corresponds to the sequence of the satellite currently being tracked. The signal from the satellite is received by antenna 46, amplified, down converted to base band and filtered in down converter 47. The base band output of the down converter is then correlated against the signal generated by the local code generator in code correlation 44. Signals from only one satellite can be tracked at a time with the equipment shown. To track signals from multiple satellites, which is required for position determination, either the equipment shown must be replicated or time sequenced. The equipment will only track signals from a satellite whose code matches the code being generated by the local code generator 42.

In order to correlate the locate code with the signal received from the satellite the phase of the local code must be adjusted to match the code of the received signal. The control computer can vary the phase of the local code by sending command to the delay line to vary the delay. The delay line however only allows the delay to be varied over the period of one 1.023 MHz clock cycle (977 nanoseconds). The delay required to match the transmission delay of the signal from the satellite is about 73 milliseconds, i.e. over 73 full repeats of the code generator (a full code sequence is 1 milliseconds long). The integer number of repeats can be disregarded since they will not affect system operation. The remainder of the delay must be generated by increasing the delay of the delay line. The maximum delay to which the delay can be set is 977 nanoseconds and up to 1 millisecond of delay may be required. The delay over 977 nanoseconds is generated by stepping the delay to 977 nanoseconds and then setting it to zero and advancing the delay to the maximum value again. The timing of the pulse that loads the data into the latch is set so that to the code generator the increase of delay is a continuous process. The computer 8 has a counter implemented in software that counts the number of delay line cycles. This process is repeated until the desired delay is obtained. For example to increase the delay by 3 microseconds the delay line must be cycled from minimum to maximum delay 3 times plus advanced 67 nanoseconds.

The exact delay required to track the signal from the satellite is initially not known, but the approximate delay can be computed. It is necessary once the approximate delay is set to slowly vary the delay until the signal out of the correlator indicates that the signal transmitted by the satellite has been detected. The correlator also provides information to the computer that indicates the presence of any phase mismatch between the locally generated code and that received from the satellite. The computer adjusts the local delay and hence the phase of the local code so that it matches the phase of the received code. A phase error will be sensed when the range to the satellite changes. The computer will readjust the phase to minimize the phase error. This process must continue as long as the signal is being tracked.

The receiver 41 can tell from which satellite incoming signals originate, since the code of each satellite is unique. After the transmissions from a particular satellite are identified, position information on the position of the satellite with respect to the earth, is gathered. This position information is transmitted as an additional modulation on the transmitted carrier and can be extracted by the correlation. The position information is used to determine where the identified satellite is situated relative to the earth. Due to the position of a particular satellite over the earth, the signal coming from the particular satellite will take many milliseconds to reach correlator 44. The signals from four satellites contain sufficient information to allow the calculation of the exact position of the receiver circuit 41 on the earth. First, the position of receiver with respect to the satellites is calculated, and then the position of the receiver circuit 41 relative to the earth is calculated.

Figure 4:
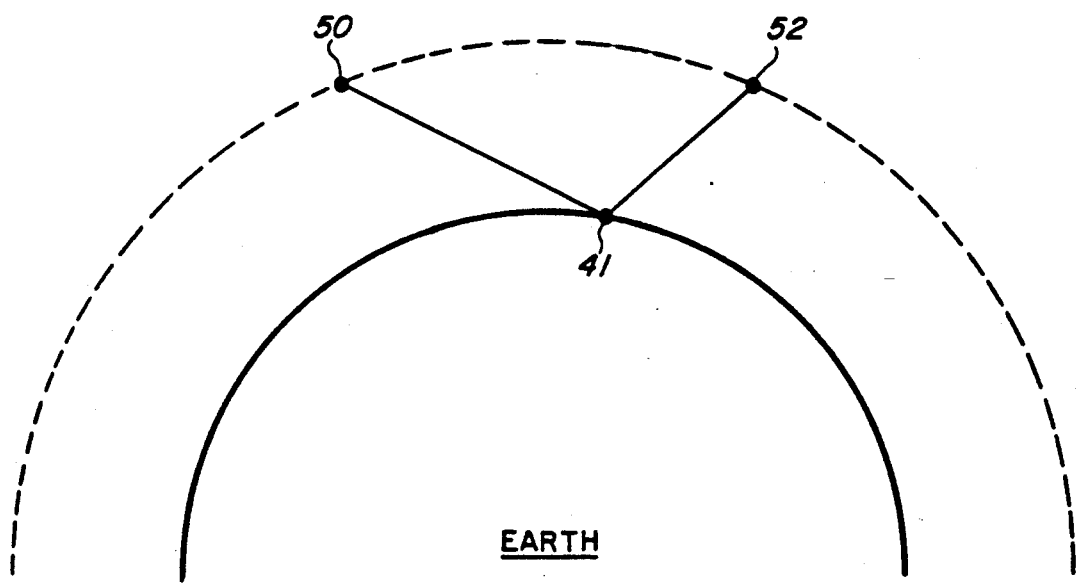
FIG. 4 is a diagram of satellites and a receiver in relation to the earth.

All of the satellites 46, 48 et cetera, send out their transmissions at the same time. The difference in distance from the receiver circuit 41 to satellites 50 and 52 can be determined by calculating the time difference for travel of a signal from a first satellite 50 and a second satellite 52 to receiver circuit 41. In FIG. 4, the time needed for the signal to travel from satellite 50 to receiver 41 may be 72 milliseconds. The time needed for a pulse train to travel from satellite 52 to receiver circuit 41 may be 70 milliseconds. Thus, the time difference is 2 milliseconds. Given the speed of light, the receiver 41 would be 0.77 million meters closer to satellite 48 than to satellite 46. The locations of both satellite 46 and satellite 48 relative to the earth are also known from position data (satellite ephemeris) received from the satellites. This process is repeated using the signals from at least four satellites. With this information the location of receiver circuit 41 relative to the earth may be determined.

While the present invention has been disclosed in connection with the preferred embodiment thereof, it should be understood that there may be other embodiments which fall within the spirit and scope of the invention as defined by the following claims.

What is claimed is:

1. A variable pulse rate circuit, comprising:
   (a) a computer means for generating a succession of binary words having a succession of binary values, respectively;
   (b) a latch means activated by the computer means for successively holding each of the succession of binary words;
   (c) a delay means activated by the binary words in the latch means, for producing an amount of delay corresponding to the binary value of the binary word held in the latch means; and (d) a pulse generator means for generating a train of pulses, the pulses being sent into the delay means, each and every one of the pulses then being emitted by the delay means at a time dependent on the amount of delay produced by the delay means.

2. A satellite tracking receiver circuit, for detecting coded satellite transmissions, comprising:
   (a) a computer means for generating a sucession of binary words having a sucession of binary values, respectively;
   (b) a latch means activated by the computer means for sucessively holding each of the sucession of binary words;
   (c) a delay means activated by the binary word in the latch means, for producing an amount of delay corresponding to a value of the binary word held in the latch means;
   (d) a pulse generator means for generating a train of pulses, the pulses being sent into the delay means, each and every one of the pulses then being emitted by the delay means at time dependent on the amount of delay produced by the delay means;
   (e) a code generator means for generating a code sequence in response to pulses being emitted by the delay means;
   (f) pulse correlator means for correlating the code sequence with a code sequence of the satellite transmissions, the pulse correlator means providing a signal that is indicative of correlation between the two code sequences;
   (g) a down converter for lowering the frequency of the satellite transmissions; and
   (h) antenna means for receiving the satellite transmissions.

3. The circuit of claim 2 wherein a counter is used in the computer means to count a number of full delay line cycles generated by the computer means.

* * * * *